United States Patent [19]

McCarty

[11] 4,236,705

[45] Dec. 2, 1980

[54] SCULPTURE HOLDING APPARATUS

[75] Inventor: Mary D. McCarty, Meridian, Id.

[73] Assignee: Fun Sculpture, Inc., Boise, Id.

[21] Appl. No.: 937,076

[22] Filed: Aug. 28, 1978

[51] Int. Cl.[3] .............. B23Q 3/02

[52] U.S. Cl. .............. 269/100; 269/137; 269/208; 269/306

[58] Field of Search .............. 269/45, 75, 99-100, 269/208, 321 A, 303, 306, 137; 118/500-503

[56] References Cited

U.S. PATENT DOCUMENTS

| | | | |
|---|---|---|---|
| 95,337 | 9/1869 | Goulden | 269/321 A |
| 307,178 | 10/1884 | Carter | 269/45 |
| 546,421 | 9/1895 | Dake | 269/45 |
| 1,954,708 | 4/1934 | Mass | 269/321 A |
| 2,655,191 | 10/1953 | Partin | 269/208 |

*Primary Examiner*—Robert C. Watson

*Attorney, Agent, or Firm*—Paul F. Horton

[57] ABSTRACT

Apparatus for holding a wet clay sculpture during the drying process which includes a base portion having post receiving apertures equidistantly spaced about its periphery; at least three vertically extending posts rotatably seated in the apertures, the posts having vertically spaced horizontal openings; and a plurality of horizontally extending support members slidingly engaging the openings for contacting and holding the sculpture in place. Pivotal sculpture contact members attachable to the support members may also be provided.

2 Claims, 4 Drawing Figures

10

SCULPTURE HOLDING APPARATUS

BACKGROUND OF THE INVENTION

1. Field of the Invention

This invention relates, in general, to devices for holding items in an upright manner and, in particular to devices for propping wet sculpturing clay during the forming and drying process.

2. Background of the invention

Because of the semi-solid nature of fresh sculpturing clay, a prop is often needed to hold the clay figure in an upright position and to hold various extensions or appendages of the figure in proper relation to the figure and to each other. Most often such props are improvised, on the spot, to support the figure at a particular inclination with frequent collapse, damage or disfigurement of the sculptural figure. Furthermore, it is generally impossible to move the sculpture from place to place, even when partially dry, because of the fragile support offered by the props.

SUMMARY OF THE INVENTION

The present invention provides a sculpture holding device including a base portion having post receiving apertures equidistantly spaced about its periphery; at least three vertically extending posts each having a plurality of vertically spaced horizontal openings; and support members slidingly engaging the openings and operable to contact and hold the wet sculpture. The vertical posts are rotatable in the apertures to facilitate positioning. A more comprehensive description of the apparatus may be found in the claims.

It is therefore a general object of the present invention to provide a sculpture holding device which is inexpensive to construct, which is readily disassembled for packaging and readily assembled for use, and which provides solid support to wet sculptures by providing a multiplicity of contact and support angles and positions.

It is furthermore an object of the present invention to provide a sculpture holding device having a plurality of horizontally extending support arms which are horizontally rotatable toward and away from one another; which may be horizontally extended toward one another and which may be positioned in an upward or downward relationship to one another.

It is also an object of the present invention to provide a sculpture holding device which enables movement of an unhardened sculpture from place to place.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
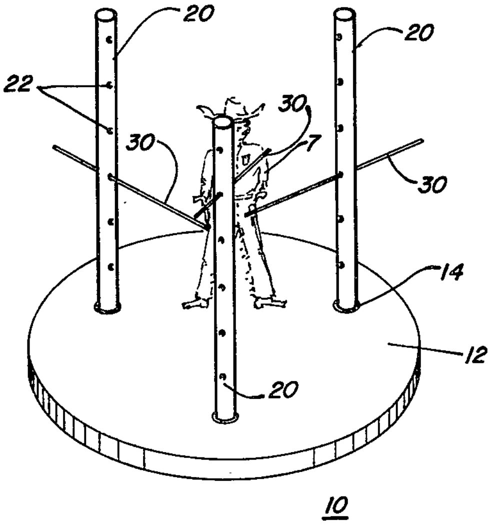
FIG. 1 shows in perspective view the sculpture holding apparatus of the present invention as supporting an unhardened sculptured figure.
Figure 2:
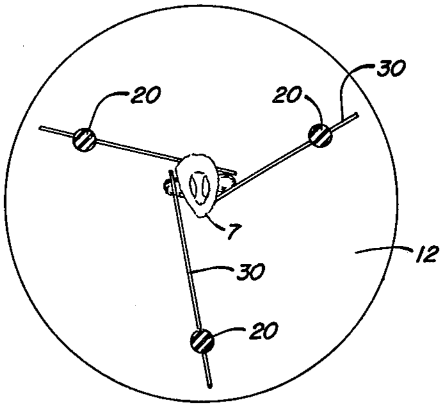
FIG. 2 is a plan view of the apparatus of FIG. 1.
Figure 3:
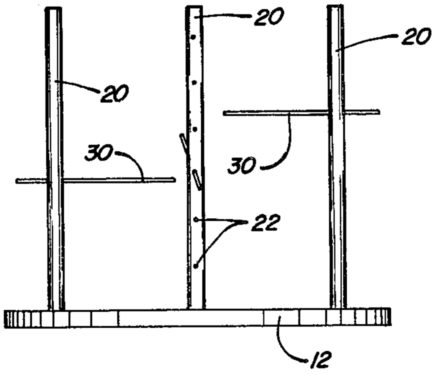
FIG. 3 is an elevational view of the apparatus of FIG. 1.

Referring now to FIGS. 1 through 3, a sculpture holding device 10 made according to the present invention is shown as holding a wet clay sculptured FIG. 7. Device 10 includes a base 12; vertically extending posts 20; and horizontal support members 30.

Base piece 12, in the preferred embodiment, is a circular waterproof plate having planar opposing sides and having a diameter of 10" and a thickness of 1". Three cylindrical apertures 14 are recessed ¾" into the top surface adjacent the peripheral edges of the base, equidistant from each other in triangular orientation. Apertures 14 may be drilled or molded in the base and are preferably 9/16" in diameter. If desired, additional apertures may be provided, preferably equidistant from one another about the periphery of the base. The base may be formed of plastic batt, polyvinyl or other plastic, metal, or any other suitable material.

Cylindrical vertical posts 20, equal in number to apertures 14, are provided for insertion into the apertures. Posts 20 may be approximately 12" in length and may have a diameter of 178 " which allows for convenient roatation of the posts in the apertures while still providing a firm vertical support. Posts 20 may be made of ordinary wooden dowels or other suitable material. Posts 20 have horizontal openings 22, approximately 3/32" in diameter, drilled or formed therethrough at 1" vertically spaced intervals. Openings 22 are preferably cylindrical in form unless sculpture contact member 40 is used for contacting the wet sculpture, as will and hereinafter be explained. Insertable into openings 22 are horizontally extending support members 30 for contacting and holding the wet sculpture in place. Horizontal members 30 are approximately 6" in length and may be cylindrical in form, having a diameter of 1/16" which adapts them to slide through the openings 22 a desired distance. Wooden dowels may be used for the horizontal members. Any desired number of support members 30 may be used at any one time.

Figure 4:
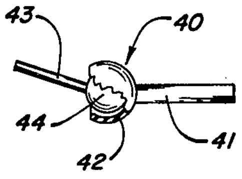
FIG. 4 is a perspective view of the sculpture contact member of the present invention.

Attachable to one end of any of the horizontal support members 30 for making contact with the wet sculpture 7 is sculpture contact member 40, as shown to advantage in FIG. 4. Member 40 includes a socket portion 42 and a ball portion 44 seated within the socket for frictionally and pivotally engaging the socket. Protruding from the rear of socket 40 is a hollow tube 41 having an opening 1/16" in diameter or slightly larger for firm attachment over the free end of dowel 30. Protruding in a substantially opposite direction from tube 41 is finger 43, attached to ball 44, for making contact with the wet sculpture. It will be seen that as ball 44 is pivoted within the socket 42, a great many positions are provided for fingers 43 in their contact with the wet sculpture. Sculpture contact member 40 is preferably made in its entirety from a light-weight plastic such as polyvinyl or polyethylene. Ball 44 may be hollow to reduce the weight. Where contact member 40 is used on conjunction with and on the end of horizontal members 30, it is desirable that member 30 not be rotatable within openings 22. This may be accomplished by either providing square or other shaped horizontal openings 22 in posts 20 or, in the alternative, reducing the diameter of openings 22 for snug frictional engagement with horizontal members 30.

In operation, wet sculpturing clay in the block form of the figure desired is placed in substantially the center of the top surface of base plate 12, as shown in FIG. 1. As the clay is sculptured, the clay may be held in place by either finger 43 of contact member 40 or by individual horizontal members 30. It will be seen that members 30 may be retracted or extended through openings 22 a desired distance and may be horizontally rotated by simply rotating vertical post 20 in their post receiving aperture 14. It will also be seen that horizontal members 30 may be placed at any desired height through the vertically spaced openings. As it is desirable not to place any substantial pressure on the wet sculpture, a minimum of 3 horizontal members 30, extending from a minimum of 3 vertical posts 20 to provide contact on more than 2 sides, is required. When using sculpture contact member 40 on end of one of horizontal members 30, it will be seen that contact pressure from many different angles may be placed against the wet sculpture.

Having thus described in detail preferred embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. Apparatus for supporting an unhardened sculpture comprising:

a substantially circular base provided with a planar top surface having an unobstructed center portion including three post receiving apertures spaced equidistantly from one another adjacent its periphery;

three vertically extending posts, circular in cross section, each rotatably seated in one of said apertures, each of said posts including a plurality of horizontal openings cylindrically cut therethrough and vertically spaced from one another; and a plurality of cylindrical support members, each of said members adapted to horizontally extend through and slidingly engage one of said openings, for holding the sculpture in place.

2. The apparatus of claim 1, further comprising at least one sculpture contact member having a socket member and a ball member operable to frictionally and pivotally engage said socket member, said socket member including a tubular member on its rearward most end adapted to frictionally engage a terminal free end of one of said support members, and said ball member having an attached arm adapted to engage the sculpture for holding the sculpture in place.

* * * * *